United States Patent [19]

Lenertz et al.

[11] Patent Number: 4,636,130
[45] Date of Patent: Jan. 13, 1987

[54] RAILROAD TRACK TRAILER

[75] Inventors: John I. Lenertz, Brainerd, Minn.; Dennis J. Tessenske, Eau Claire, Wis.; Ricky J. Ferrari, Crosby, Minn.

[73] Assignee: Western States Company, Omaha, Nebr.

[21] Appl. No.: 658,269

[22] Filed: Oct. 5, 1984

[51] Int. Cl.⁴ .............................................. B60P 1/00
[52] U.S. Cl. ................................. 414/500; 105/160; 105/355; 105/404; 280/462; 280/478 R; 296/52; 410/36; 410/44; 414/532; 414/747; 414/559
[58] Field of Search .................... 410/31, 32, 34-37, 410/44, 52; 414/500, 501, 747, 506, 507, 519, 520, 529, 532, 533, 534, 535, 536, 745, 23, 538, 559; 104/2, 7 R, 7 B; 296/52, 50, 57 R; 105/355, 404, 238 R, 1 A, 1 B, 3, 4 R, 4 A, 160, 160.5, 171; 280/462, 482, 483, 489, 486, 478 R

[56] References Cited

U.S. PATENT DOCUMENTS

| 1,532,047 | 3/1925 | Derbyshire | 414/532 |
| 1,704,269 | 3/1929 | Wattmann | 105/160 |
| 1,814,232 | 7/1931 | Sturrock | 105/160 |
| 2,836,278 | 5/1958 | Kindell | 414/535 X |
| 3,010,760 | 11/1961 | Trautmann | 296/57 R |
| 3,797,681 | 3/1974 | Brettrager | 414/559 |
| 3,812,791 | 5/1974 | Barnard | 410/44 |

FOREIGN PATENT DOCUMENTS

| 427726 | 8/1911 | France | 414/23 |
| 1511095 | 12/1967 | France | 414/747 |
| 302785 | 1/1955 | Switzerland | 105/3 |

OTHER PUBLICATIONS

The Nolan Company Brochure, Publication Date Unknown.

Primary Examiner—Frank E. Werner
Attorney, Agent, or Firm—Kinney & Lange

[57] ABSTRACT

A railroad track trailer for carrying replacement rail sections along a railroad track, which reduces the problems of having a trailer which will tend to jump off the track, when going around curves, and which includes support systems that ease the ability of workers to load and unload rail sections from the trailer.

9 Claims, 8 Drawing Figures

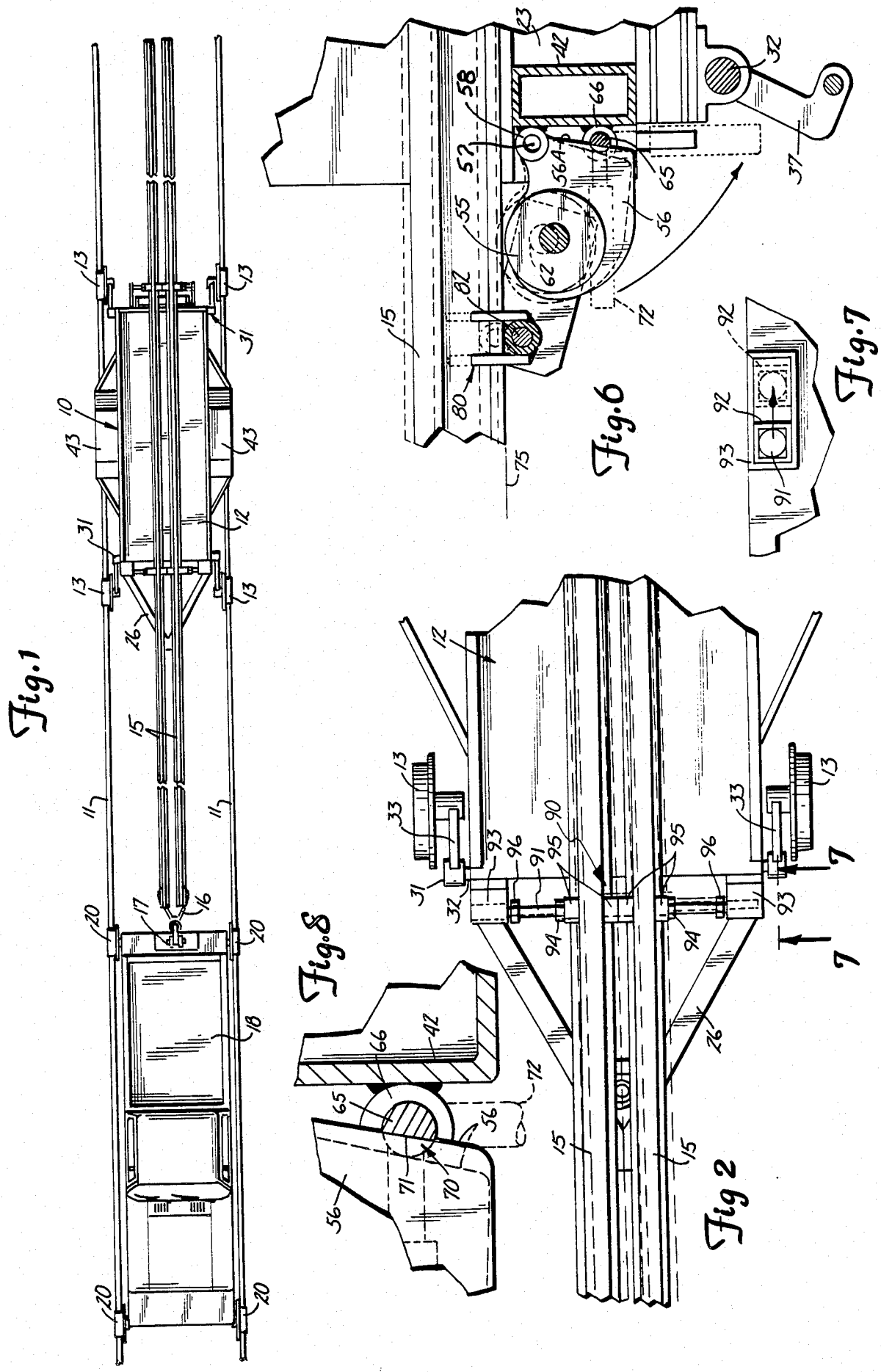

RAILROAD TRACK TRAILER

BACKGROUND OF THE INVENTION

1. Field of the Invention

The present invention relates to a trailer that can be towed behind a vehicle and used on railroad tracks for transporting rail sections that are to be replaced in a railroad track.

2. Description of the Prior Art

Various trailer type vehicles have been used for hauling railroad ties and rail sections, as well as other equipment on railroad tracks, and which are adapted for use either on tracks or on the road.

A track trailer of this general type is sold by The Nolan Company of Bowerston, Ohio. The Nolan track trailer has steel wheels for supporting it on a railroad track, as well as a pair of wheels having tires for road use. The track trailer includes a bed, a winch, and a roller support at the rear, as well as rail section clamps at the front and rear. The Nolan trailer also includes removable end gates. In the normal operation, rail sections will be clamped onto the trailer bed and the outer end of the rail sections will be used for attaching a hitch or towing tongue directly to the rail section. Then a pickup truck or vehicle suitably equipped with steel wheels for running on rails in a normal manner will be hitched to the leading end of the rail section and the trailer located at the midsection of the rail, will support the rail section as the trailer is towed down the railroad track. One of the problems is that the curves on railroad tracks sometimes vary, and the rigid connection of the rail sections to the trailer may cause the wheels of the trailer to jump the tracks, causing the need for retracking, and not only tying up the track, but also delaying replacement of rail sections. In the prior art the rails are fixedly secured relative to the trailer bed, and if the curve of the track is too sharp, one set of the steel wheels will jump the track because the rails are rigidly connected to the trailer.

The winch in prior art trailers is low down, on a level of the trailer bed, and does not provide a good mechanical advantage for lifting rails, nor is it positioned so that it is out of the way for operation when the rails are extended along the bed and extend out beyond the winch itself in a forwardly direction.

The prior art trailers have removable end gates, which are placed on the trailer bed while rail sections are being moved. They are in the way, and can be lost. The present device overcomes the problems associated with using this type of a trailer for hauling rails.

SUMMARY OF THE INVENTION

The present invention relates to a track trailer for operation on a railroad track to support a pair of rail sections which extend a substantial distance fore and aft of the trailer bed, and which then may be towed at the leading end with a suitable hitch assembly. The rail sections are supported on the trailer bed, and are permitted to move slightly sideways with respect to the bed due to the mounting of one of the rail clamps, to accommodate variations in the railroad track curvature and irregularities in the railroad track construction.

The present device further includes means for storing removable tail gates in a secure position, automatically, and has a pair of support rollers at the rear over which the rails will be rolled when they are being loaded. The rollers are easily cammed from a working position to a nonworking position. In the nonworking position of the rollers the tracks are supported directly on the trailer bed and clamp members at the rear, but in the working position the rollers extend above the trailer bed to provide a rolling support for the rail sections as they are loaded onto the trailer bed.

The supports for storing the end gates comprise racks positioned below the trailer bed and accessible from the rear of the trailer. Retainer members which overlie the end of the rack when the rollers are retracted are provided to prevent the end gates from slipping out of the racks, but when the rollers are in usable position, the retainer members clear the racks so that the end gates can be removed or inserted with ease. The retainer members that prevent removal of the tail gate include the operating handle for the cam for controlling the rollers, as well as a tab also operated simultaneously with the roller cam, so that when the rail sections are secured it is assured that the end gates will be held in position and cannot be removed.

BRIEF DESCRIPTION OF THE DRAWINGS

FIG. 1 is a top plan view of a track trailer made according to the present invention having rail sections supported thereon and being towed along a railroad track by a vehicle;

FIG. 2 is an enlarged top plan view of the front portion of the track trailer of FIG. 1 shown with the track engaging wheels in their retracted position;

FIG. 6 is a sectional view taken generally along line 6—6 in FIG. 5;

FIG. 7 is a fragmentary view taken along line 7—7 in FIG. 2; and

FIG. 8 is a fragmentary enlarged sectional view generally along the same line as FIG. 6 showing a cam shaft.

DETAILED DESCRIPTION OF THE PREFERRED EMBODIMENT

Figure 3:
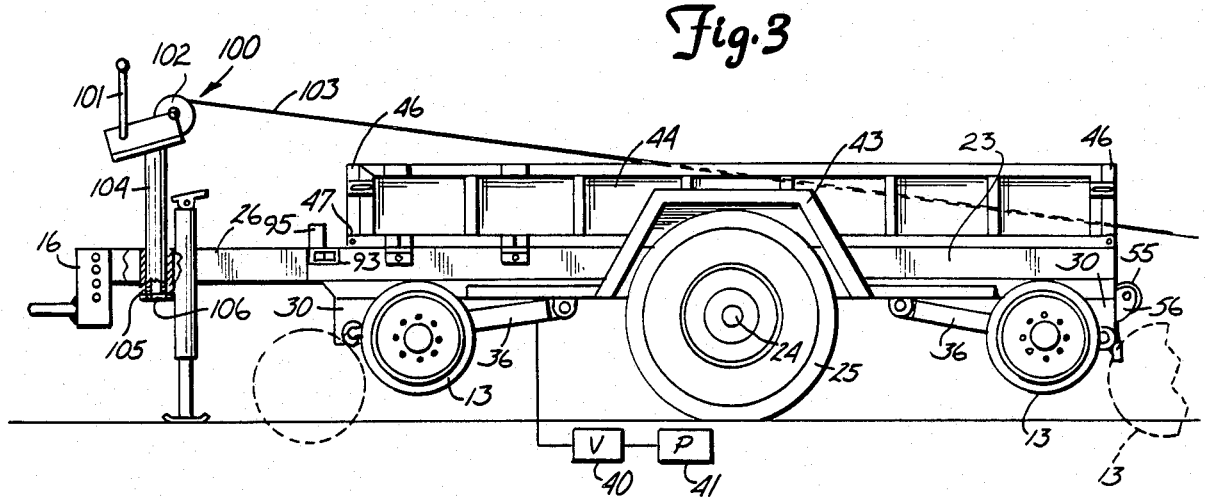
FIG. 3 is a side elevational view of a track trailer made according to the present invention with the track engaging wheels in their retracted position.

A track trailer made according to the present invention is shown generally at 10, and in FIG. 1 the track trailer is shown supported on a railroad track 11 (the ties are not shown) and the trailer is supported for movement along the railroad track 11 in a conventional manner.

As shown, the track trailer 10 has a body portion 12, including frame members as will be explained, which support retractable steel railroad wheels indicated generally at 13, that are in their working position as shown in FIG. 1 engaging the rail forming track 11. The trailer body 12 is usable for supporting a pair of elongated rail sections indicated at 15,15 that are supported in a suitable manner on the trailer body, and a hitch assembly 16 is bolted to the ends of the rail section 15 at the forward end thereof in a conventional manner. The hitch assembly in turn is attached to a hitch tongue 17 on a vehicle 18, such as a pickup truck, that also has retractable railroad wheels 20,20 operatively engaging the railroad track 11 for a movement along the track. By using the hitch assembly 16, the trailer body 12 of the track trailer 10 and the rail sections 15 are capable of being towed along the railroad track 11 to a remote location. The track trailer 10 is primarily used for transporting rail sections to locations where rail sections of the railroad track 11 are to be replaced.

The railroad track trailer body 12, as shown in FIG. 3, has longitudinally extending side frame members 23,23 that are used for supporting an axle assembly indicated generally at 24 that has wheels with rubber tires 25 thereon for permitting the trailer to be towed on the road when rail wheels 13 are retracted using a hitch pole 26. The hitch assembly 16 is used at the forward end of the hitch pole 26 in FIG. 3 for towing the trailer over roads. The hitch assembly 16 bolts to the hitch pole 26 for use, after it has been removed from the rail sections 15. When rail sections 15 are to be transported, hitch assembly 16 is removed from the hitch pole and again bolted to the ends of the rail sections on the trailer. The axle assembly 24 can be any desired type of axle, and as shown in the prior art, this arrangement is well known.

The side frame members 23 have suitable supports shown at 30 attached thereto for supporting front and rear pivoting rail wheel axle assemblies indicated generally at 31 for the steel wheels 13. These axle assemblies have a cross shaft 32 pivotally mounted on the trailer bed and have struts 33,33 at an opposite end that extend outwardly from the main pivot axis and rotatably support the steel wheels 13. A separate hydraulic cylinder 36 is connected between the trailer body 12, in the center portions thereof, to a suitable arm 37 fixed to the respective cross shaft as shown in FIG. 6 so that the axle assemblies 31, and the struts 33 can be pivoted to a working position as shown in FIG. 1 and in dotted lines in FIG. 3 and to a retracted position as shown in solid lines in FIG. 3. The hydraulic cylinders 36 can be operated with a valve 40, and pump 41 that can either be a manual pump, or an electrically driven pump if desired driven from the battery of the towing vehicle.

It should be noted that when the axle assemblies 31 are pivoted to a working position, the struts and the wheels 13 go over center, and will rest against suitable stops or supports to remove the load from the cylinders 36 while the trailer is supported on the rails. Also, with the device of the present invention the wheels 13 support the trailer bed so that the rubber tires 25 clear the tracks 11, eliminating any tendency of the rubber tires 25 to drag on the rail rails, which dragging may also cause problems on curves when transporting rails.

Figure 5:
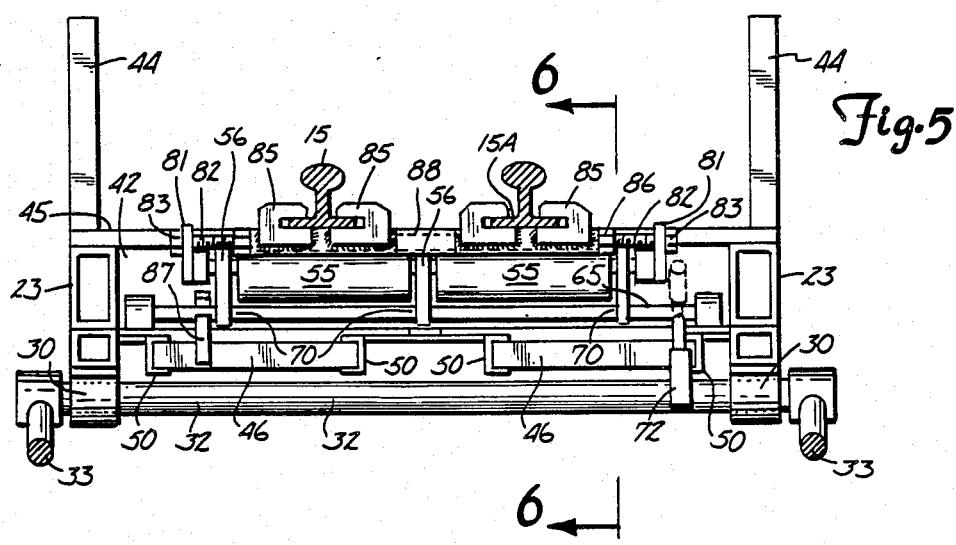
FIG. 5 is a rear end view of the device in FIG. 3 shown with rail sections in towing position on the trailer bed.

In addition to the longitudinally extending frame members 23, the trailer frame has front suitable cross frame members, at both the front and the rear, for example, a rear cross member 42 is shown in FIGS. 5 and 6. Fenders 43 are used over the rubber tires 25. The trailer body 12 is provided with a box formed of upright side panels 44 suitably mounted to the side frame members 23, and a floor or bed plate 45 is mounted on the frame members of the trailer. The side panels 44 may be removable, if desired.

Suitable end gates 46 are also provided at the front and rear of the trailer. These end gates 46 are pivotally mounted for movement about a horizontal axis to pivot from open to closed (vertical) positions and are removable from the trailer body. The removability of the end gates is well known in pickup trucks and the like, and any desired mounting structure that permits the end gates to be pivoted and removed can be utilized. As shown, pivot mounting brackets for the end gates are shown generally at 47.

When the trailer is to be used to transport rail sections 15, the end gates 46,46 are removed. This leaves the bed 45 defining a plane from the front to the rear of the box between the upstanding side panels 44 on the trailer frame, and a clear space in which to support rail sections 15,15.

Figure 4:
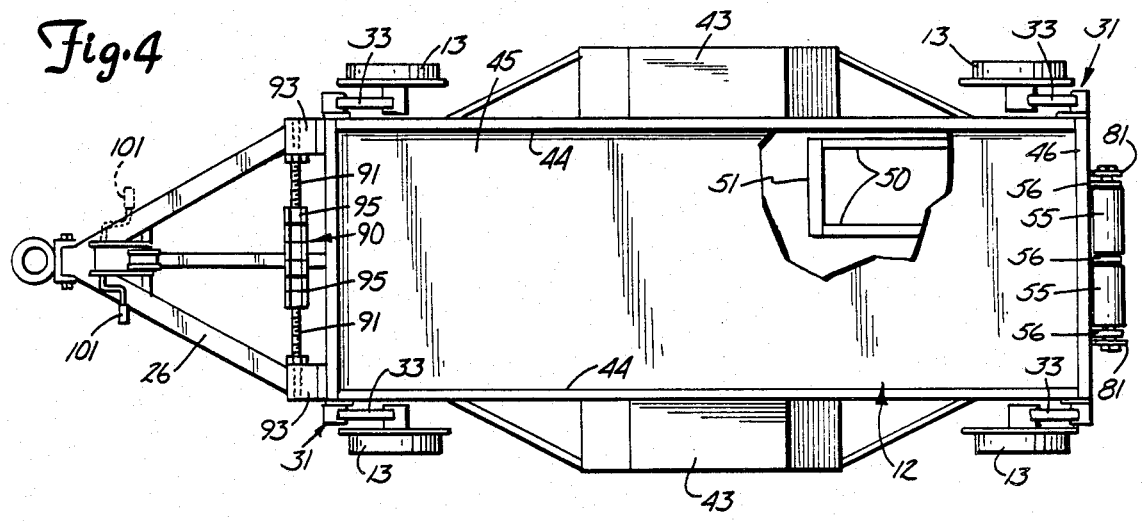
FIG. 4 is a top plan view of FIG. 3 with parts in section and parts broken away.

In order to store the end gate sections, as shown in FIGS. 4, 5 and partially in FIG. 6, a pair of end gate racks are supported below the trailer bed. These racks, as shown perhaps best in FIGS. 5, each comprise a separate pair of elongated rack guides 50,50 that extend fore and aft and which are spaced laterally apart sufficiently to receive an end gate 46. The rack guides are supported on the framework of the trailer, and are just above the rear cross axle shaft 32, as shown. The end gates 46,46 fit into and slide along rack guides, and are stopped in forward direction with a cross member 51, as shown in FIG. 4 schematically. The racks and end gates are also shown partially in FIG. 6. The rack guides can be made of channel iron or angle iron as desired, and the tail gates will slide along these racks quite easily. The racks are accessible from the rear of the trailer, except when the retainers for holding the tail gates 46 in position are lowered.

At the rear of the trailer there are a pair of rollers 55, mounted for rotation about a horizontal axis, on individual roller support plates 56. The roller support plates 56 are pivotally mounted relative to the rear cross member 42 on pins 57 that in turn are rotatably mounted in hubs 58 that are fixed to a rear cross member of the frame assembly. The rear cross member 42 as can be seen supports the deck 45, and is connected to the side frame members 23. The rollers 55 are mounted on a suitable shaft indicated at 62 that may extend through all three of the roller support plates 56, and the rollers 55 can be mounted on such shaft on suitable bushings in any conventional manner. The roller support plates 56 are made so that the cams pivot downwardly about pins 57 under gravity, and each plate has a camming edge surface shown at 56A in FIG. 6 that rides against a cam shaft 65. The cam shaft 65 in turn is rotatably mounted in suitable hubs 66 also attached to the rear cross member 42. There can be two or three or more hubs 66 along the length of the cam shaft, so that the cam shaft is supported for rotation about its axis. The cam shaft 65 is also shown in FIG. 8. The cam shaft may be mounted in suitable bearings for ease of operation.

As shown in FIG. 8, and also as shown in FIGS. 5 and 6, the cam shaft 65 has three portions formed therein, by recessing or cutting away a portion of the shaft as shown at 70 in FIG. 8 to form a cam surface 71 that is a planar surface forming a chordal plane that is closer to the axis of rotation, or center of the shaft, than the outer peripheral (cylindrical) surface.

A cam actuator handle indicated at 72 is mounted adjacent one end of the cam shaft 65 (see FIG. 5) and can manually be moved from its solid line position shown in FIG. 5 wherein the cam shaft will be in the position shown in FIGS. 6 and 8 in solid lines to a position substantially 90° from the solid line position. As shown in FIG. 8 when the handle is in its down position, the cam surface 71 formed by the recesses 70 will permit the camming edges 56A of the roller support plates 56 to move about the axis of the pins 57 so that the cam surface 56A is closer to the cross member 42. This lowers the center of the roller shaft 62, and thus the upper edge of the rollers 55, so that the upper edge of the rollers, in the solid line position of FIG. 6 is below the plane 75 of the trailer bed 45. When the cam actuating lever 72 is lifted upwardly, to the second position shown in FIG. 6 with the lever 72 extending generally horizontally, (the dotted line position shown in FIG. 5) the cam shaft 65 will rotate so that the camming edges 56A of the roller support plates 56 will be moved away from the center of the cam shaft generally as shown by the dotted lines in FIG. 8, to lift the shaft 62 supporting the rollers 55 and thus lift the upper edge of the rollers 55 above the plane 75. As will be explained, when the rail sections 15 are being loaded, the cam shaft will be in the position lifting the rollers so that the upper edge of the rollers is above the plane of the trailer or platform 45 so that the rails can be rolled onto the platform across the rollers 55 for a substantial distance without having a high friction load on the rail sections.

Thus, the working position of the rollers 55 is with the cam shaft 65 lifting the rollers 55 so that the upper edge of the rollers 55 is above the plane 75 of the bed 45 of the trailer.

When the rail sections are supported for transport shown in FIG. 1, they must be clamped in position to prevent them from sliding across the bed 45. At the rear of the trailer bed, with the present invention using the pivoting support rollers 55, standard rail clamp means indicated generally at 80 are supported on the shaft 62 for the rollers. A pair of arms 81 are mounted on opposite ends of the shaft 62, outside of the outer roller support plates 56, and these arms are mounted on suitable hubs so that they can pivot about the axis of the shaft 62. The arms 81, when they are not in use, will pivot downwardly out of the way about the axis of the shaft 62 and hang below the rollers 55. However, when they are to be used, they will be moved to the position shown in FIGS. 5 and 6. The arms 81 have outer end portions that are sufficiently long to clear the outer edges of the roller support plates 56, and these outer ends of arms 81 in turn mount a threaded cross rod 82 that extends between the arms 81,81. This threaded cross rod can be pinned to suitable hub members 83 on the arms 81. The threaded rod 82 is part of a conventional rail clamping assembly, and as shown in FIG. 5, the clamping assembly includes lower clamp members of substantially identical construction but arranged in pairs. These clamp members shown at 85 slide on the threaded rod 82. After the rail sections 15 are in position on rollers 55 when first loaded, the rollers can be lowered by operating cam shaft 65 and arms 81 can be pivoted upwardly with the clamp members 85 arranged in the first and second pairs and separated sufficiently to grip flanges 15A of the rail sections as shown in FIG. 5. Suitable nuts 86 can be threaded against the outer edges or surfaces of the clamp members 85 to push the clamp members together and clamp against the flanges 15A on the rail sections 15. The clamp members have overhanging lips that fit over the flanges. A spacer 88 is positioned on the threaded rod 82 in the center to space the first pair of clamp members holding a first rail section 15 from the second pair of clamp members.

The nuts 86 can be tightened down as desired to hold the rails in the proper location.

Normally the rail sections 15 will not be clamped until the cam shaft 65 has been moved to retract the rollers (to their retracted position) with the handle 75 down so that the rail sections 15 are supported on the surface of the track bed and then clamped in position. The rail sections 15 can be clamped while they are still supported on the rollers 55, if desired.

It should also be noted that when the cam shaft handle 72 is in its down position, it will retain one of the tail gates 46 on the right hand side rack of the trailer as shown in FIG. 5, and as a further retainer member for the other tail gate, a radially extending arm 87 is fixed to the cam shaft 65 near the left hand end as shown in FIG. 5, on the outside of the roller support plate 56 on that side of the trailer. The arm member 87 is mounted to be substantially parallel to the handle 72, and is of sufficient length so that when the handle 72 is in its down position as shown in FIG. 5 the arm 87 also blocks the space between the supports 50 for the second tail gate 46, so that both tail gates are securely held in position when the rollers 55 are retracted. The weight of the rollers 55 and their support plates 56 is sufficient to keep the cam shaft handle 72 and arm 87 in the down positions and hold the tail gates in the racks even if no rail sections are supported on the trailer. Of course when the rail sections are supported, the arm 87 and handle 72 are positively locked so that the tail gates cannot be removed. When the rail sections are to be removed, or have been removed, and the cam shaft handle 72 is rotated to lift the rollers 55, by operating the cam sections against the camming edge 56A of the roller plates 56, the handle 72 and the arm 87 move to a clearing position so that the tail gates can either be removed or reinserted in the rack guides.

The arms 81 for the rear rail clamps, will normally depend or hang downwardly when there are no rails on the trailer, but the arms can be pivoted up out of the way to permit the tail gates to be inserted or removed.

As stated previously in discussing the prior art, problems have arisen with towing these long rail sections because of the curves of the railroad tracks are not within acceptable limits. The leverage on the rail section is such that the front steel wheels can jump off the track, as the rails are not permitted to shift at all relative to the trailer body in the prior art device. To solve this problem, front rail clamping assembly illustrated generally at 90 is provided to permit slight shifting of the rails relative to the bed 45. The clamping assembly 90, as shown includes a threaded cross rod 91 that has suitable end slide members shown at 92 in FIG. 7, attached thereto. These end slide members 92 as shown are comprised of blocks that are fixed to the rod and are slidably mounted in an outer slide support section 93. The slide support section 93 is elongated in the fore and aft direction so that the blocks 92 and their respective ends of the threaded rod 91 can shift fore and aft a distance sufficient to compensate for normal rail curvature according to railroad standards, and also shift endwise of the rod (transverse to the trailer).

As shown, the threaded rod 91 supports rail clamp members 95 which are identical to those shown as clamp members 85, and when the rail sections 15 are in position on the trailer bed they will be held in sets of clamp members 93, and then clamped together with suitable nuts 96 that hold the rails in these clamp members. Additionally, adjustable nuts 96 are positioned just to the interior of the slide members 93, so that the amount of endwise movement of the threaded rod 91 can be controlled as well.

The sliding mount in the slide members 93 permits a horizontal movement of the rails, because the slide members or blocks 92 can slip fore and aft and side to side to permit the rail sections to move in the horizontal plane to twist if the curves encountered require a slight shifting of the rail sections from their towed end relative to the supports on the steel wheels 13. In this manner, accommodation is made for differences in the curves as shown by the dotted line representation of the threaded rod 91 in FIG. 2, and also this movement is shown by the dotted line representation of the block 92 and the rod 91 in FIG. 7.

Without the present invention, because of the long lever arm of the rail between the towed end and the trailer, the curvature of curves in railroad tracks cause the trailer to derail.

An additional feature of the present invention is the ability to utilize the winch for providing a lifting component to the rails that are being loaded from the rear of the trailer. As shown, a winch assembly indicated generally at 100 is a typical manually operated winch having a manual handle 101, on one side thereof, and a winch drum 102 that controls a cable 103. The winch assembly is mounted onto a tubular pipe support member 104 that in turn is mounted into a tubular socket 105 fixed to the hitch pole assembly 26 in substantially the center of the trailer. The bottom of the tubular pipe 104 has a cutout notch that engages a cross pin or bar 106 at the bottom of the socket 105 to detent the pipe 104 in position for working. The notch is on both sides of the pipe so it will detent in two positions 180° apart.

The upright pipe support 104 is capable of being moved axially in and out of the socket 105 with a slip fit, and it can be seen that the support raises the winch 100 up above the plane 75 of the bed 45 to provide an angle of lift tending to lift up from the rollers 55, so that the rail section will be lifted when the cable 103 is threaded over the rollers. As the rail sections are winched on there will be a further lifting action so that the rails can be rolled on relatively easily.

Additionally, the removability of the support pipe permits the winch to be rotated 180° and detented in position so it can be used in two positions. There are situations where the first end portions of the rail sections will both be winched up partially onto the trailer bed, and the ability to rotate the winch 180° puts the operating handle 101 clear of the one rail section that is in position or is being moved into position, so the winching job for the second rail section is easier than with conventional winches. The dotted line position handle 101 in FIG. 4 shows the alternate position. Conventional winches that mount close to the plane of the trailer bed 45 do not provide the lifting action, the cables get in the way of the rail sections being loaded, and in general the ability to lift and move the rail sections onto the trailer bed is restricted.

Additionally, the pipe support 104 can be removed from socket 105 for transport. When the rail sections are supported on the trailer bed and are to be clamped with the front clamp assembly, the winch can be removed and put into the trailer body for transport.

It also should be noted that the adjustment nuts 95 for the threaded rod 91 can be placed in any desired location to permit sufficient axial movement along the length of the rod 91 (transverse to the direction of movement of the trailer) to accommodate the shifting that is shown in dotted lines. The clamp assembly 90 can be used for only one rail section if desired, as well as two rail sections as shown.

The present trailer thus solves the problems associated with moving rail sections for repairing railroad tracks.

Although the present invention has been described with reference to preferred embodiments, workers skilled in the art will recognize that changes may be made in form and detail without departing from the spirit and scope of the invention.

What is claimed is:

1. A trailer for use in carrying railroad rail sections on a railroad track, including wheel means for permitting movement of the trailer along a railroad track, a trailer bed, said trailer bed being mounted on said wheel means and extending in a fore and aft direction and comprising:

means for clamping a rail section on the trailer with the rail section supported on the trailer bed, said means for clamping including a first adjustable clamp assembly at a leading edge of said trailer bed, and a second adjustable clamp assembly at a trailing edge of said trailer bed; and means for mounting said first adjustable clamp assembly to the trailer bed for permitting limited transverse movement of a rail section supported on said first clamp assembly with respect to said trailer bed;

a roller mounting assembly at the trailing portion of said trailer bed, said roller mounting assembly comprising at least one roller and at least one pair of support arm means rotatably mounting said roller, means to pivotally mount said support arm means to the underside of the trailing portion of said trailer bed on a first axis, and a cam operator comprising a cam shaft rotatably mounted on the trailer bed on a second axis extending transversely across the trailer bed at the trailing end of the trailer bed, said second axis being generally parallel to the first axis and positioned spaced from the first axis, said cam shaft having cam means thereon to engage and be movable against said arm means to move said arm means from a first position wherein an upper edge of said roller is above the plane of the trailer bed, to a second position wherein the upper edge of said roller is below the trailer bed;

removable end gate means from said trailer, said trailer bed having at least one rack below the plane of said trailer bed and accessible from an end thereof for receiving an end gate means for said trailer after the end gate means has been removed; and retainer means associated with said cam operator movable to a position wherein said retainer means obstructs one end of the rack to retain said end gate means in the rack when the roller is moved to its second position and wherein said retainer means is moved to a position clearing the end of said rack when said roller is moved to its first position.

2. The apparatus as specified in claim 1 wherein said means for mounting said first adjustable clamp assembly comprises a transversely extending rod member, a pair of rod supports for opposite ends of said rod member adjacent opposite lateral sides of said trailer bed; and means for slidably engaging said rod supports mounted on the opposite end of said rod whereby a limited amount of fore and aft sliding movement is permitted between said means for mounting and said rod supports to accommodate movement within a normal range of rail curvature.

3. The apparatus as specified in claim 2 wherein said first adjustable clamp assembly comprises a plurality of clamp members, cooperating in separate pairs, axially mounted on said rod member so that a pair of said clamp members engage opposite side portions of each rail section supported on the trailer bed.

4. The apparatus as specified in claim 1 wherein said cam shaft has a handle member thereon, said handle member comprising the retainer means.

5. The apparatus as specified in claim 4 wherein there are two racks for supporting two tail gate means, the handle member being aligned with a first of said racks, and a separate arm member mounted on said cam shaft and aligned with a second of said racks for holding a second of said tail gate means, said arm member moving to a position clearing the second rack when the roller is moved to its first position.

6. The apparatus as specified in claim 5 wherein said trailer bed has a winch socket on a front end thereof, said winch socket comprising a sleeve, a winch support pipe, a winch on one end of said winch support pipe, the opposite end of said winch support pipe fitting in said sleeve, said winch support pipe extending a substantial distance above the plane of the trailer bed and having a line operable to engage a rail section positioned to the rear of the trailer frame and drag said rail section over said roller for loading the rail section onto said bed.

7. The apparatus as specified in claim 6 wherein said winch support pipe fits into said sleeve in two positions 180° from each other, said winch comprising a manual handle operated winch, said two positions placing the handle on opposite lateral sides of the center line of said trailer bed.

8. The apparatus as specified in claim 1 wherein said second adjustable clamp assembly comprises a pair of second arm members mounted on said means to pivotally mount said support arm means, a cross rod mounted between the ends of said second arm members opposite the mounting to said means to pivotally mount, and a plurality of clamp members cooperating as separate pairs, axially mounted on said cross rod, so that a separate pair of said clamp members engage opposite side portions of each rail section supported on the trailer bed.

9. The apparatus as specified in claim 1 wherein the rail sections supported on the trailer bed extend forwardly from the trailer bed and further comprising means for hitching the trailer to vehicular means for pulling the trailer, said hitching means being removably connected to a leading edge of the trailer bed, whereby when rail sections are supported by the trailer bed, said hitching means is removed from the trailer bed and removably connected to the forwardly extending ends of the rail sections supported on the trailer bed, thereby hitching the rail sections to the vehicular means.

* * * * *